(12) United States Patent
Bodapotula et al.

(10) Patent No.: US 10,827,338 B1
(45) Date of Patent: Nov. 3, 2020

(54) SCAM MITIGATION BACK-OFF

(71) Applicant: T-Mobile USA, Inc., Bellevue, WA (US)

(72) Inventors: Srinivasa Rao Bodapotula, Bellevue, WA (US); Homer Nicolas B. Filart, Renton, WA (US); Jose R. Mendoza, Jr., Renton, WA (US); Sandip K. Shrestha, Lynnwood, WA (US); Sarah M. Fleming, Arlington, VA (US); Kevin Wai-Chun Lam, Renton, WA (US); Tong Luo, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/773,451

(22) Filed: Jan. 27, 2020

Related U.S. Application Data

(60) Provisional application No. 62/881,681, filed on Aug. 1, 2019.

(51) Int. Cl.
  *H04W 4/90*   (2018.01)
  *H04L 29/06*  (2006.01)
  *H04M 3/42*   (2006.01)
  *H04W 4/12*   (2009.01)

(52) U.S. Cl.
  CPC ............ *H04W 4/90* (2018.02); *H04L 65/102* (2013.01); *H04L 65/1006* (2013.01); *H04M 3/42059* (2013.01); *H04W 4/12* (2013.01); *H04L 65/1016* (2013.01); *H04M 2203/2005* (2013.01); *H04M 2207/18* (2013.01); *H04M 2242/04* (2013.01)

(58) Field of Classification Search
  CPC ........... H04W 4/90; H04W 4/12; H04W 4/16; H04W 12/12; H04W 12/1202; H04W 12/1204; H04W 12/06; H04L 63/14; H04L 63/1408; H04L 63/1441; H04L 65/102; H04L 65/1016; H04M 3/42042; H04M 3/436; H04M 1/571; H04M 2203/2038; H04M 2203/2005; H04M 2207/18; H04M 2242/04; H04M 3/42059
  See application file for complete search history.

(56) References Cited

U.S. PATENT DOCUMENTS

| | | | |
|---|---|---|---|
| 8,255,572 B1 * | 8/2012 | Coomer ............... | G06Q 10/107 709/248 |
| 9,124,623 B1 * | 9/2015 | Chen .................... | H04L 63/1433 |
| 10,455,085 B1 * | 10/2019 | Roundy .............. | G10L 15/1822 |
| 10,542,137 B1 * | 1/2020 | Sial ..................... | H04L 65/1069 |
| 10,601,986 B1 * | 3/2020 | Botner ................ | H04L 65/1069 |

(Continued)

*Primary Examiner* — Jean A Gelin
(74) *Attorney, Agent, or Firm* — Han Santos, PLLC

(57) ABSTRACT

A request is received to suspend providing scam protection to a user device that initiated an outgoing emergency voice call or an outgoing emergency communication message to a Public Safety Answering Point (PSAP). Scam protection for the user device is suspended for a predetermined time period, which allows the PSAP to make return emergency voice calls or send return emergency communication messages to the user device without the scam protection server marking the return emergency voice calls as a scam voice call or marking the emergency communication messages as a scam message during the predetermined time period.

20 Claims, 9 Drawing Sheets

(56) References Cited

U.S. PATENT DOCUMENTS

| | | | | |
|---|---|---|---|---|
| 2006/0041754 A1* | 2/2006 | Hind | .................... | G06Q 20/401 |
| | | | | 713/176 |
| 2010/0120361 A1* | 5/2010 | Rappaport | ............ | H04W 88/04 |
| | | | | 455/18 |
| 2014/0192965 A1* | 7/2014 | Almeida | ............... | H04M 3/436 |
| | | | | 379/70 |
| 2014/0237599 A1* | 8/2014 | Gertner | ............... | H04L 63/1441 |
| | | | | 726/24 |
| 2018/0103144 A1* | 4/2018 | Gupta | .................. | H04M 3/382 |
| 2018/0324297 A1* | 11/2018 | Kent | .................... | H04M 3/436 |
| 2018/0367511 A1* | 12/2018 | Chichibu | ................ | H04W 4/14 |
| 2019/0014064 A1* | 1/2019 | Strauss | .................. | G06N 20/00 |
| 2019/0215346 A1* | 7/2019 | Seyvet | .................. | H04M 11/04 |

\* cited by examiner

SCAM MITIGATION BACK-OFF

CROSS REFERENCE TO RELATED PATENT APPLICATION

This application claims priority to U.S. Provisional Patent Application No. 62/881,681, entitled "E-911 Back-Off From Scam Mitigation," filed on Aug. 1, 2019, which is hereby incorporated by reference in its entirety.

BACKGROUND

Caller ID is a feature that enables users of telecommunication devices to be notified of who a caller is before the user answers the call. In order to assist users with differentiating between wanted and unwanted calls, a wireless carrier network may implement a scam alerting function on its core network. The scam alerting function may make use of a scam telephone number database that contains a list of suspicious telephone numbers. The suspicious telephone numbers are identified by the wireless carrier network as being associated with fraudulent or nefarious call activities. Accordingly, when an incoming call destined for a user device of a call recipient is identified, such as via the scam telephone number database, as a suspicious telephone number, the scam alerting function may cause the user device to display a warning message along with the suspicious telephone number when the user device is presenting an incoming call notification.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
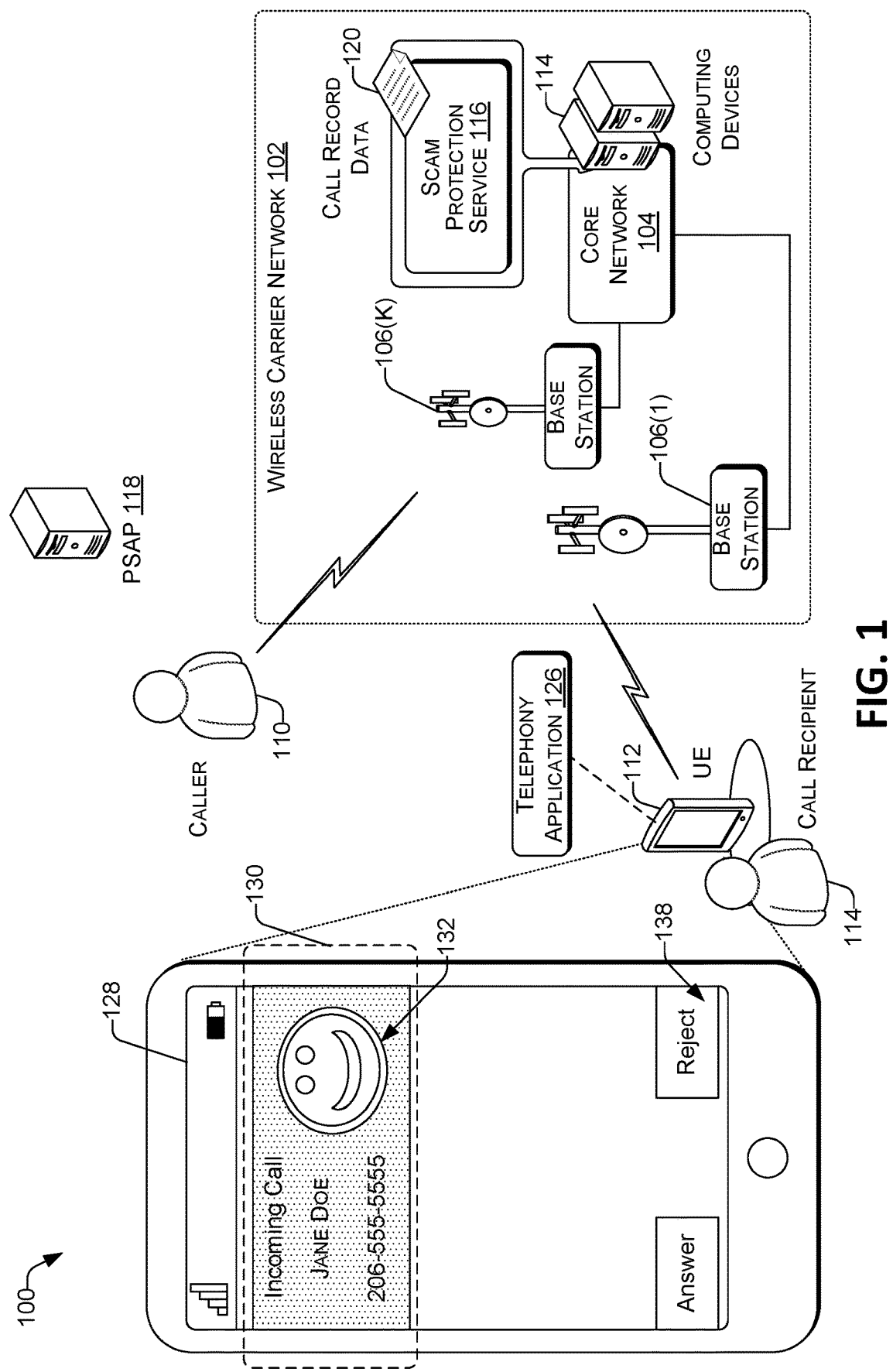
FIG. 1 illustrates an example wireless carrier network architecture that implements scam call detection.

A E911 communication may necessitate multiple outbound and incoming messages and voice calls between a user device and emergency services. For example, if a call to emergency services is dropped, then the emergency services may try to reach the caller at the originating number. However, if a scam alerting/protection function is activated, then some of the messages or voice calls may be marked as a scam communication.

It would be preferable that scam protection services are disabled for incoming communication so that texts and voice communication originating from emergency services are not marked as incoming scam communications by the scam alerting/protection function. The present disclosure is directed to preventing such scam alerting/protection services from marking incoming texts and voice communication originating from emergency services (e.g., E911 communications) as scam communications.

In an embodiment, the scam alerting/protection function may be inactivated for a predetermined time period for a user device that places an emergency voice or text communication. In some embodiments, the predetermined time period may be established by a timer implemented by the scam alerting/protection function. The predetermined time period may be extended if additional emergency communications are initiated by the user device after the timer is originally initiated. The predetermined time period may be set to an initial value and extended by predetermined extension time values if needed. In one example, the predetermined time period may be two hours.

By implementing such a timer, emergency services may be provided adequate time to communicate with the user device without the scam alerting/protection function erroneously marking the E911 communications as scam communications. This may provide greater assurances that emergency services may reach a user device, without the scam alerting/protection function erroneously tagging the communication.

In an embodiment, the scam protection server may receive a request to suspend providing scam protection to a user device that initiated an outgoing emergency voice call to a Public Safety Answering Point (PSAP). The PSAP may be a call center configured to answer calls to an emergency telephone number for emergency services such as police, firefighting and ambulance services. In response to the request, scam protection for the user device may be suspended for a predetermined time period. The request may be received, in one example, from an Interconnect Session Border Controller (I-SBC) or a core network of the wireless carrier network that carried and/or originated the outgoing emergency voice call.

The request may include an identifier such as a telephone number, E.164 formatted number, or a Mobile Station International Subscriber Directory Number (MSISDN) that identifies the user device to the scam protection server. In this case, the scam protection for the user device may be suspended based on the MSISDN.

If the request lacks an MSISDN that identifies the user device, the MSISDN may be retrieved from a Gateway Mobile Location Center (GMLC) based on an alternative identifier included in the request. In an embodiment, the alternative identifier may include an International Mobile Equipment Identity (IMEI) or an Integrated Circuit Card Identifier (ICCID). In this example, the scam protection for the user device may be suspended based on the MSISDN.

The suspending of the scam protection allows the PSAP to make return emergency voice calls to the user device without the scam protection server marking the return emergency voice calls as a scam voice call during the predetermined time period. Scam protection for the user device may be reactivated in response to expiration of the predetermined time period.

In some embodiments, an additional request may be received from the I-SBC of the wireless carrier network asking the scam protection server to determine whether the return emergency voice call is to be marked as a scam call. If the additional request is received during the predetermined time period, a notification may be sent to the same or a different I-SBC that the scam protection is suspended. This may prompt the I-SBC to send the return emergency voice call to the user device without scam protection. The additional request can additionally or alternatively be received from a core network of the wireless carrier network.

During the predetermined time period, if an additional request is received to suspend providing scam protection to a user device that is associated with an additional outgoing emergency voice call from the user device to the PSAP, the predetermined time period may be extended by an additional time period that starts at a time that the additional request is received at the scam protection server.

In some embodiments, a messaging server of a wireless carrier network may receive an outgoing emergency communication message originating from a user device and destined for a PSAP. The emergency communication message may be, for example, a Short Message Service (SMS) message, a Rich Communication Services (RCS) message, or a Multimedia Messaging Service (MMS) message. In response, the scam protection service may be directed to suspend scam protection for the user device for a predetermined time period, which may allow the PSAP to send return emergency communication messages to the user device without the scam protection service marking the return emergency communication messages as a scam message during the predetermined time period. In some embodiments, a return emergency communication message is received from the PSAP that is destined for the user device, and when scam protection for the user device is suspended, the return emergency communication message is sent to the core network of the wireless carrier network for the core network to deliver the return emergency communication message to the user device without scam protection.

Suspension of scam protection for the user device in the case of a communications message may include sending a Session Initiation Protocol (SIP) invite message to an Interconnect Session Border Controller (I-SBC) of the wireless carrier network that directs the I-SBC to command the scam protection service to suspend scam protection for the user device. Additionally or alternatively, suspension of scam protection for the user device may include sending a command to the scam protection service that directs the scam protection service to suspend scam protection for the user device. Additionally or alternatively, suspension of scam protection for the user device may include sending the emergency communication message to an intermediate network to cause the intermediate network to send a SIP invite message to the I-SBC that directs the I-SBC to command the scam protection service to suspend scam protection for the user device.

The emergency communication message received from the user device may be delivered to the PSAP. In some embodiments, the emergency communication message may be sent to an intermediate network for the intermediate network to forward the emergency communication message to a messaging terminal of the PSAP. In one embodiment, I-SBC of the wireless carrier network may determine that scam protection for the user device is suspended by querying the scam protection service.

In some embodiments, an additional emergency communication message originating from the user device may be received at the messaging server, and the predetermined time period may be extended by an additional time period that starts at a time that the additional emergency communication message is received at the messaging server.

Some systems may implement a call classification engine to analyze call record data to determine a likelihood that the caller is someone that is known to the call recipient. The caller record data may also be analyzed to determine a trustworthiness of the caller. This information may be used to notify the user via a user interface to determine whether to answer or reject the incoming call from the caller. In some embodiments, the call classification engine may be configured to deactivated during the time period. In other embodiments, the call classification engine may be configured to notify the user interface to answer all calls during the timer period.

FIG. 1 illustrates an example wireless carrier network architecture 100 that implements scam call detection, alerting, and mitigation. The wireless carrier network 102 may include a core network 104 and a radio access network. The radio access network may include multiple base stations, such as base stations 106(1)-106(K). Each of the base stations 106(1)-106(K) may provide a corresponding network cell that delivers telecommunication and data communication coverage. The core network 104 may use the network cells to provide wireless communication services to user devices. The core network 104 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 104 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as communication with backend servers in the core network 104.

Accordingly, the base stations 106(1)-106(K) are responsible for handling voice and data traffic between user devices and the core network 104, such as a user device (UE) 112 of a call recipient 114. In various instances, the user devices may include smartphones, tablet computers, and/or other wireless communication devices that can be used to make and receive voice telephone calls or send and receive communications messages.

The backend servers of the core network 104 may execute a scam protection service 116. The scam protection service 116 may analyze calls and associated data to determine if the call is likely a scam call. For example, the scam protection service 116 may analyze call record data of callers that are serviced by the wireless carrier network 102. The analysis may enable the scam protection service 116 to generate a finding based on factors such as reliability and behavior for a caller that is placing an incoming call to a caller recipient who is a subscriber of the wireless carrier network. The call record data of individual callers may include call detail records (CDRs) 120 that contain various attributes of calls made by the individual callers.

In one example, a caller may use a user device to place an incoming call using a telephone number to UE 112 of call recipient 114. As the call routes to the core network 104, the scam protection service 116 may perform analytics on various data sources to determine whether the incoming call is likely to be a scam call. For example, the data sources may include call record data 120 of the callers serviced by the wireless carrier network 102, a database of known scam call phone numbers, a database of commonly spoofed phone numbers, and/or other sources of data. The application of analytics may generate a likelihood that the incoming call is likely to be a scam call.

Subsequently, the core network 104 may send an incoming call notification message to the user device such as UE 112. In some embodiments, the messaging may be performed using the Session Initiation Protocol (SIP), the Hypertext Transfer Protocol (HTTP), and/or so forth. The notification message may include an indication from the scam protection service 116 as to whether the incoming call is likely to be a scam call. In turn, a telephony application 126 on the UE 112 may present an incoming call notification interface 128 that displays the indication. For example, the indication may include text, a color, an icon, or a combination thereof that corresponds to the indication. Further, the incoming call notification interface 128 may present caller information regarding the caller 110, such as the telephone number 118 of the caller, a geographical location (e.g., city, state information) associated with the telephone number of the caller, and/or a name associated with the call 110.

For example, the incoming call notification interface 128 may include a portion 130 that presents the caller information. The portion 130 may further contain an icon 132 that may indicate a likelihood that an incoming call associated with the caller information is a scam call. In some instances, the likelihood may be presented as an indication of whether the caller is known to the call recipient 114, i.e., a friend rather than a stranger. However, in other instances, the scam protection service 116 may be configured by the call recipient 114 to block all incoming calls that are determined by the scam protection service 116 as likely scam calls from reaching the UE 112.

The identification of potential scam messages may be made in a similar manner. In one example, a message originator may use a user device to send a message using a telephone number to UE 112 of call recipient 114. The scam protection service 116 may perform analytics on various data sources to determine whether the incoming message is likely to be a scam message. The application of analytics may generate a likelihood that the incoming message is likely to be a scam message. In some embodiments, the blocking of incoming calls or incoming messages may be referred to as a scam block.

Figure 2:
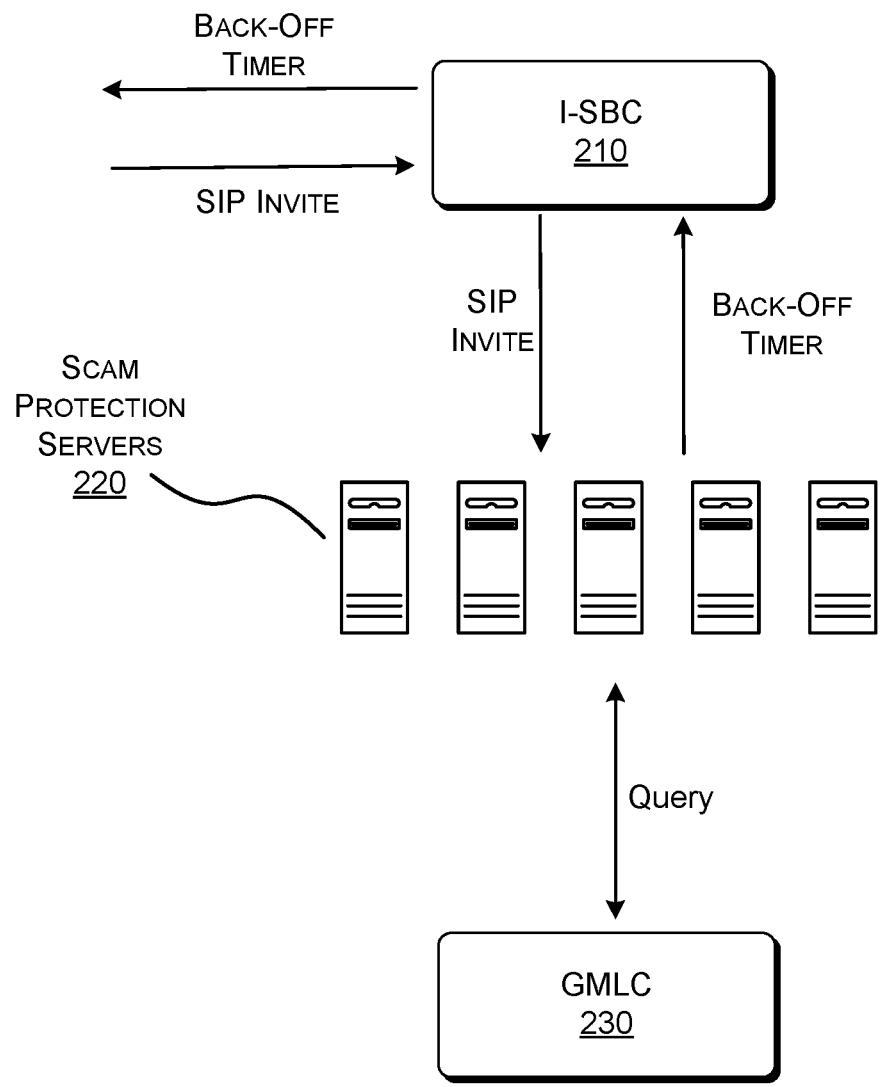
FIG. 2 shows an example architecture that implements scam mitigation back-off.

FIG. 2 is a block diagram showing various components of that can provide a scam mitigation function as disclosed herein. In the example, scam solution services may be implemented in one or more scam solution servers. In one example, scam protection servers 220 may check for the status of scam protection. If scam services are active, scam protection may be suspended for the user device. A Session Initiation Protocol (SIP) invite message may be sent to I-SBC 210 of the wireless carrier network. The scam protection servers 220 may implement a back-off mechanism for a predetermined time.

The SIP message may include an identifier such as a telephone number, E.164 formatted number, or an MSISDN that identifies the user device to the scam protection servers 220. In this case, the scam protection for the user device may be suspended based on the MSISDN. If the request lacks an MSISDN that identifies the user device, the MSISDN may be retrieved from a GMLC 230 based on an alternative identifier included in the request. In an embodiment, the alternative identifier may include an IMEI or an ICCID. In this example, the scam protection for the user device may be suspended based on the MSISDN. The scam solution servers may implement back-off timers for a predetermined time period.

Figure 3:
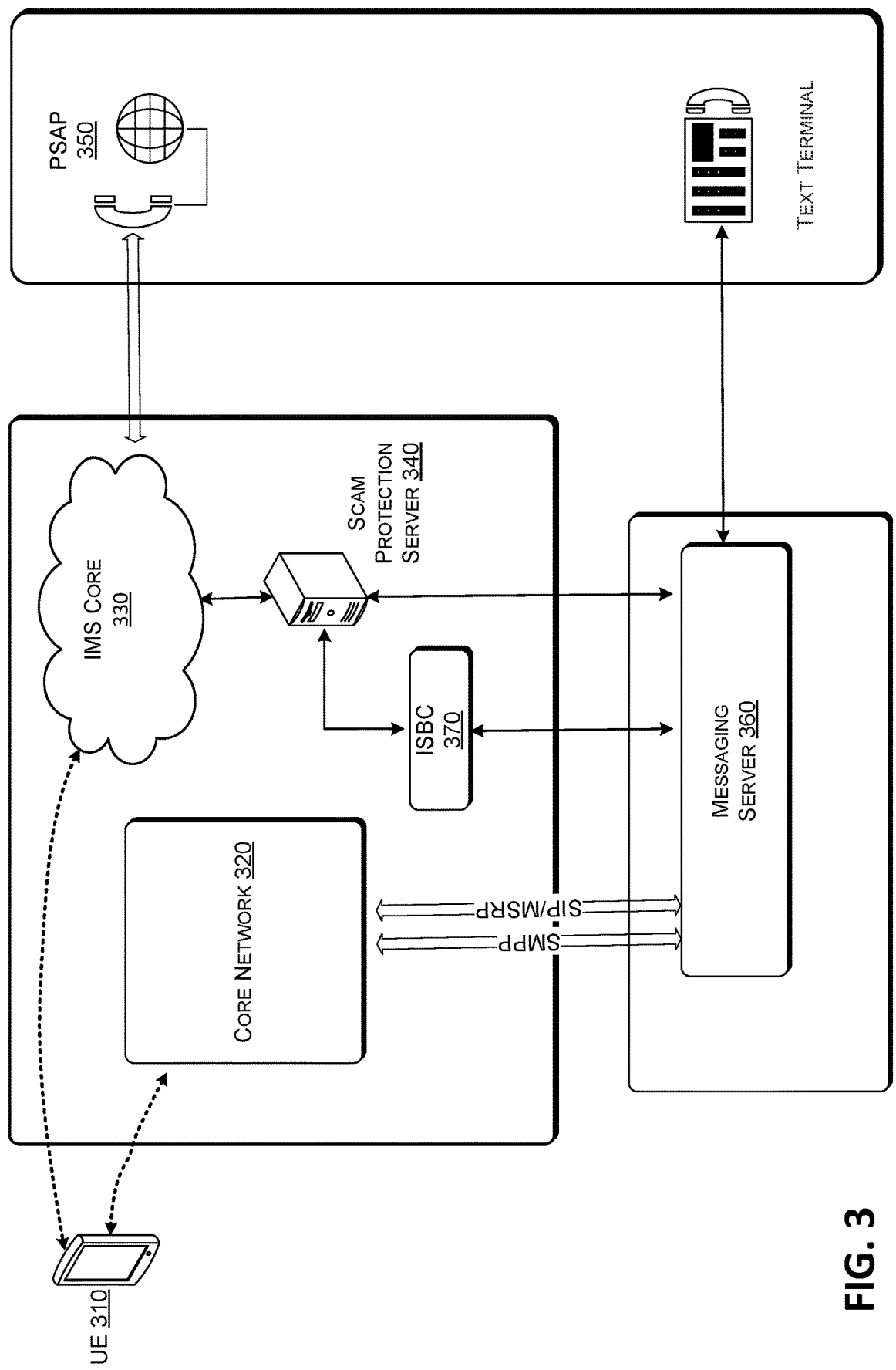
FIG. 3 is a block diagram showing various components of one or more illustrative computing devices that support scam mitigation back-off in a messaging context.

FIG. 3 is a block diagram showing various components of that can provide a scam mitigation function as disclosed herein in the context of a communications message. A messaging server 360 of a wireless carrier network may receive an outgoing emergency communication message originating from a user device (illustrated in this example as user equipment (UE) 310) and destined for a PSAP 350 via IMS core 330. The emergency communication message may be, for example, a Short Message Service (SMS) message, a Rich Communication Services (RCS) message, or a Multimedia Messaging Service (MMS) message. In response, scam protection server 340 may be directed to suspend scam protection for UE 310 for a predetermined time period, which may allow the PSAP 350 to send return emergency communication messages to UE 310 without the scam protection server 340 marking the return emergency communication messages as a scam message during the predetermined time period. In some embodiments, a return emergency communication message is received from the PSAP 350 that is destined for UE 310, and when scam protection for UE 310 is suspended, the return emergency communication message is sent to the core network 320 of the wireless carrier network for the core network 320 to deliver the return emergency communication message to UE 310 without scam protection.

Figure 4:
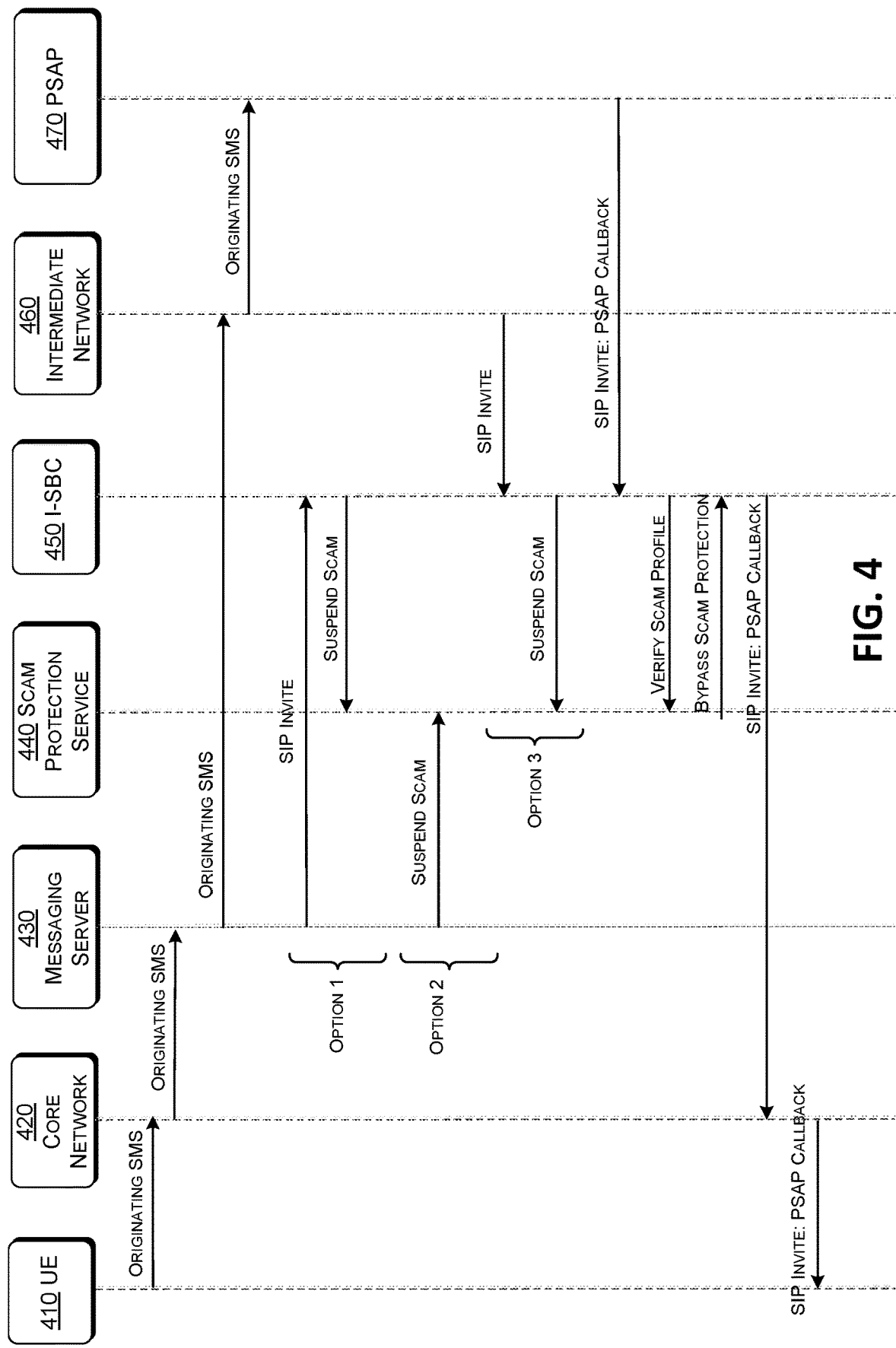
FIG. 4 illustrates example data flows that support scam mitigation back-off in a messaging context.

FIG. 4 is a flow diagram showing various examples of data flows that can implement a scam mitigation function as disclosed herein in the context of a communications message. A messaging server 430 of a wireless carrier network may receive an outgoing emergency communication message originating from a user device, e.g., UE 410, and destined for a PSAP 470 via core network 420 and intermediate network 460. In one embodiment, the suspension of scam protection for UE 410 may include sending a SIP invite message from messaging server 430 to I-SBC 450 of the wireless carrier network that directs the I-SBC 450 to command the scam protection service 440 to suspend scam protection for the user device. In another embodiment, suspension of scam protection for UE 410 may include sending a command by messaging server 430 to the scam protection service 440 that directs the scam protection service 440 to suspend scam protection for UE 410. In yet another embodiment, suspension of scam protection for the user device may include sending the emergency communication message to intermediate network 460 to cause the intermediate network to send a SIP invite message to the I-SBC 450 that directs the I-SBC 450 to command the scam protection service 440 to suspend scam protection for UE 410. In other embodiments, signaling protocols other than SIP may be used.

A return emergency communication message from the PSAP 470 may be sent to I-SBC 450, and when scam protection for UE 410 is suspended, I-SBC 450 may verify whether scam protection is currently turned on for UE 410. For example, I-SBC 450 may query scam protection service 440 as to whether scam protection is currently turned on for UE 410. Scam protection service 440 may access a scam profile for UE 410 to determine if scam protection is currently turned on for UE 410 and return an indication to I-SBC 450 that scam protection is turned off for UE 410. The ISBC may then to return the return emergency communication message without the involvement of the scam protection service 440. The return emergency communication message may be sent to the core network 420 of the wireless carrier network for the core network 420 to deliver the return emergency communication message to UE 410 without scam protection.

Figure 5:
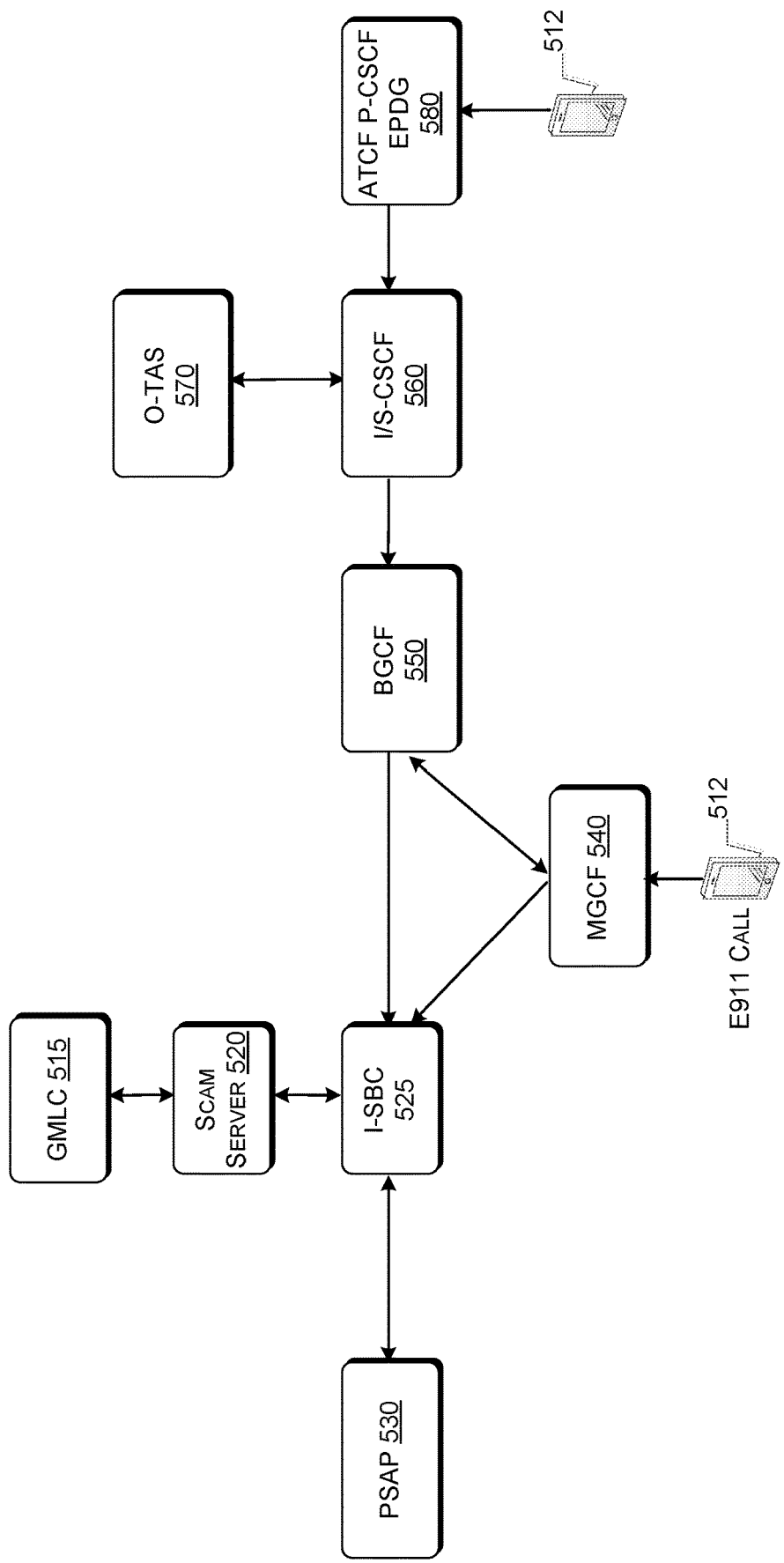
FIG. 5 is a block diagram showing various components of one or more illustrative computing devices that support scam mitigation back-off in a voice call context.

FIG. 5 is a block diagram showing various components that can provide a scam mitigation function as disclosed herein in the context of a voice call. In an embodiment, scam server 520 may receive a request to suspend providing scam protection to a user device 512 that initiated an outgoing emergency voice call to a PSAP 530. In response to the request, scam protection for the user device 512 may be suspended for a predetermined time period. The request may be received by I-SBC 525 or a core network of the wireless carrier network that carried the outgoing emergency voice call. If the request lacks an MSISDN that identifies the user device, the MSISDN may be retrieved from GMLC 515 based on an alternative identifier included in the request. The suspending of the scam protection allows PSAP 530 to make return emergency voice calls to user device 512 without the scam server 520 marking the return emergency voice calls as a scam voice call during the predetermined time period. Scam protection for user device 512 may be reactivated in response to expiration of the predetermined time period, or alternatively may be received from a core network of the wireless carrier network. As shown, calls may originate from a Media Gateway Control Function (MGCF) 540, or via connection to ATCF/P-CSCF/ePDG 580, I/S-CSCF 560, and BGCF 550.

Figure 6:
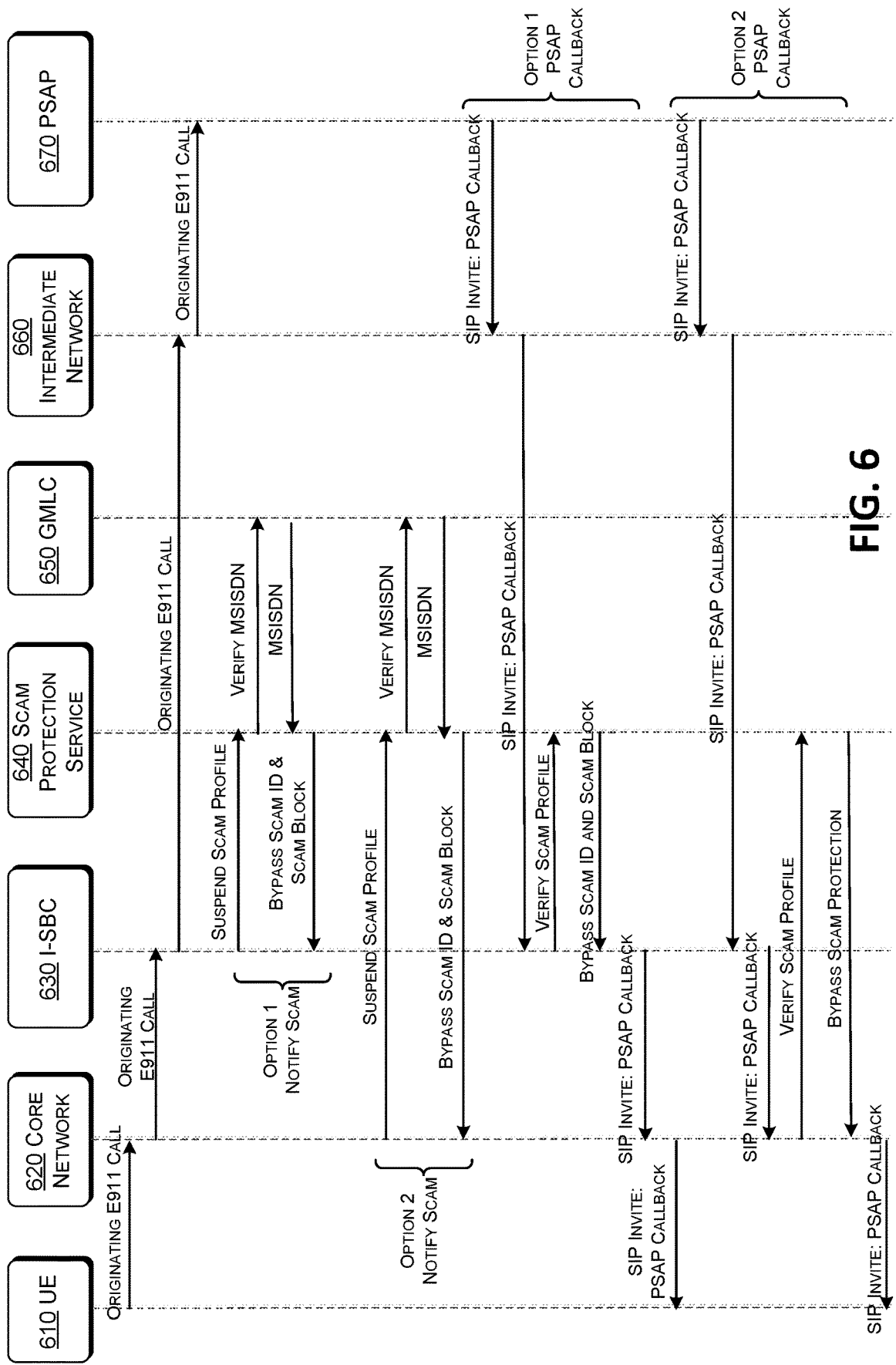
FIG. 6 illustrates example data flows that support scam mitigation back-off in a voice call context.

FIG. 6 is a flow diagram showing various examples of data flows that can implement a scam mitigation function as disclosed herein in the context of a voice call. A user device, e.g., UE 610, may originate an emergency call via core network 620 to PSAP 670. In an embodiment, the scam protection service 640 may receive a request from I-SBC 630 to suspend providing scam protection to UE 610 that initiated the outgoing emergency voice call to PSAP 670. In another embodiment, the scam protection service 640 may receive a request from the core network 620 to suspend providing scam protection to UE 610 that initiated the outgoing emergency voice call to PSAP 670. The request may include an MSISDN that identifies UE 610 to the scam protection service 640. If the request lacks an MSISDN that identifies the user device, the MSISDN may be retrieved from GMLC 650 based on an alternative identifier included in the request.

The suspending of the scam protection allows the PSAP 670 to make return emergency voice calls to UE 610 without scam protection service 640 marking the return emergency voice calls as a scam voice call during the predetermined time period.

Figure 7:
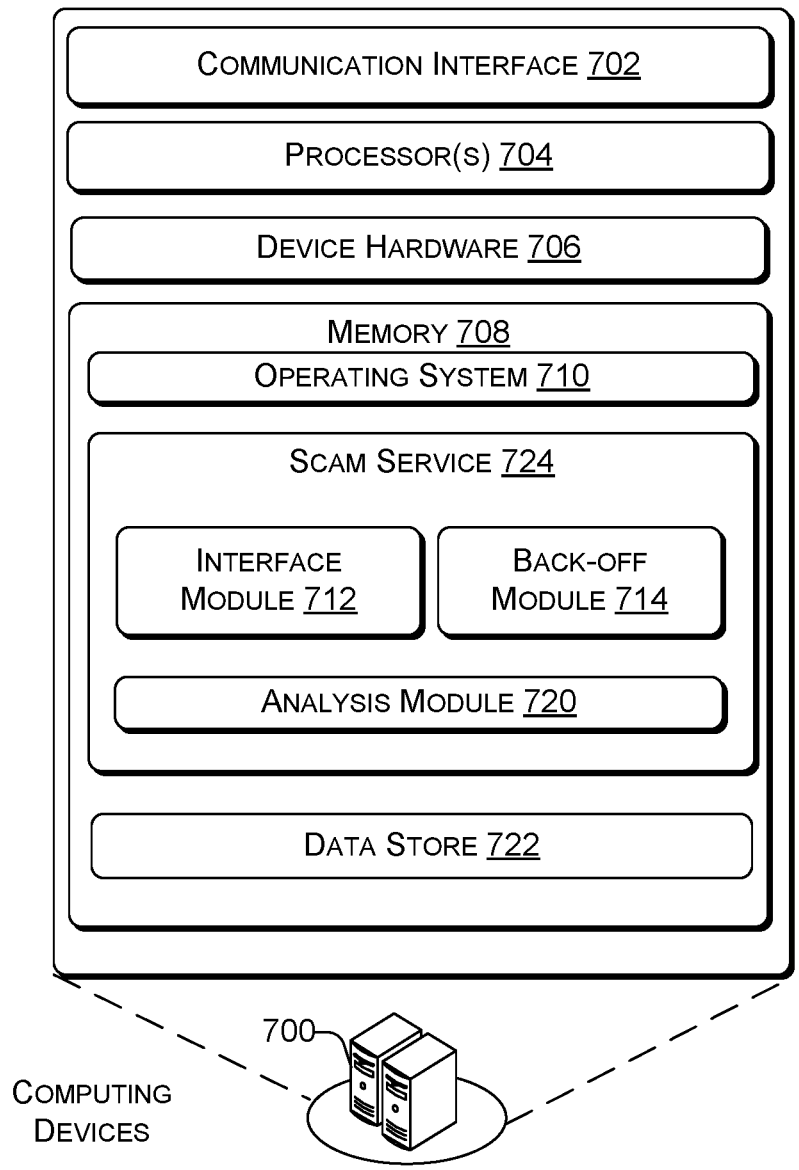
FIG. 7 is diagram showing a computing device that supports scam mitigation back-off.

FIG. 7 is a block diagram showing various components of one or more illustrative computing devices 700 that can provide scam services with mitigation. The computing devices 700 may include a communication interface 702, one or more processors 704, memory 706, and device hardware 708. The communication interface 702 may include wireless and/or wired communication components that enable the computing devices 700 to transmit data to and receive data from other networked devices. The device hardware 708 may include an additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 706 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 700 or components thereof may be virtual computing devices in the form of virtual machines or software containers that are hosted in a computing cloud.

The computing devices 700 may implement an operating system 710 and a scam protection service 724. The operating system 710 may include components that enable the computing devices 700 to receive and transmit data via various interfaces (e.g., user controls, communication interface, and/or memory input/output devices), as well as to process data using the processors 704 to generate output. The operating system 710 may include a presentation component that presents the output (e.g., display the data on an electronic display, store the data in memory, transmit the data to another electronic device, etc.). Additionally, the operating system 710 may include other components that perform various additional functions generally associated with an operating system. The operating system 710 may support the operations of the scam protection service 724.

The scam protection service 724 may include an interface module 712, a back-off module 714, and an analysis module 720. Such modules may include routines, program instructions, objects, and/or data structures that are executed by the processors 704 to perform particular tasks or implement particular abstract data types. Further, the scam protection service 724 may have access to a data store 722. The data store 722 may include one or more databases, such as relational databases, object databases, object-relational databases, and/or key-value databases that store the KPIs.

The interface module 712 may detect that an incoming call originating from a telephone number of a caller user device and destined for a terminating telephone number of a recipient user device is being routed by the core network 104, or that a communications message originating from a telephone number of a caller user device, and destined for a terminating telephone number of a recipient user device, is being routed by the core network 104. Accordingly, the interface module 712 may receive a phone number of a caller device and pass it to the analysis module, so the analysis module can determine if the number of the incoming call or incoming message is a scam number. The back-off module 714 may turn off scam protection for a predetermined period of time when a request to suspend scam protection is received. The back-off module 714 may further extend that predetermined time period for an additional time interval if another emergency call or message is initiated during the predetermined period of time, and notify a requesting party (e.g., I-SBC) that scam protection is suspended when a verify scam profile request is received.

The analysis module 720 may perform analysis and reporting functions with respect to telephone numbers of callers. The analysis module 720 may generate a scam indication that indicates a likelihood that the incoming call or incoming message is a scam call or message. The scam indication may be, for example, a binary value that indicates that the incoming call or message is more likely than not to be a scam call or message. The interface module 712 may provide the scam indication to a service of the core network 104 that sends incoming call notifications or incoming message notifications to recipient user devices The service of the core network 104 may provide the scam indication along with the telephone number of the caller user device. In various embodiments, the interface module 712 may interact with the service of the core network 104 via one or more application program interface (APIs).

The data store 722 may store data that are used by the modules of the scam protection service 724 and values computed by the modules of the scam protection service 724. For example, the data store may store the call record data of the callers and scam scores, etc. related to the telephone numbers of callers that are serviced by the wireless carrier network 102.

Figure 8:
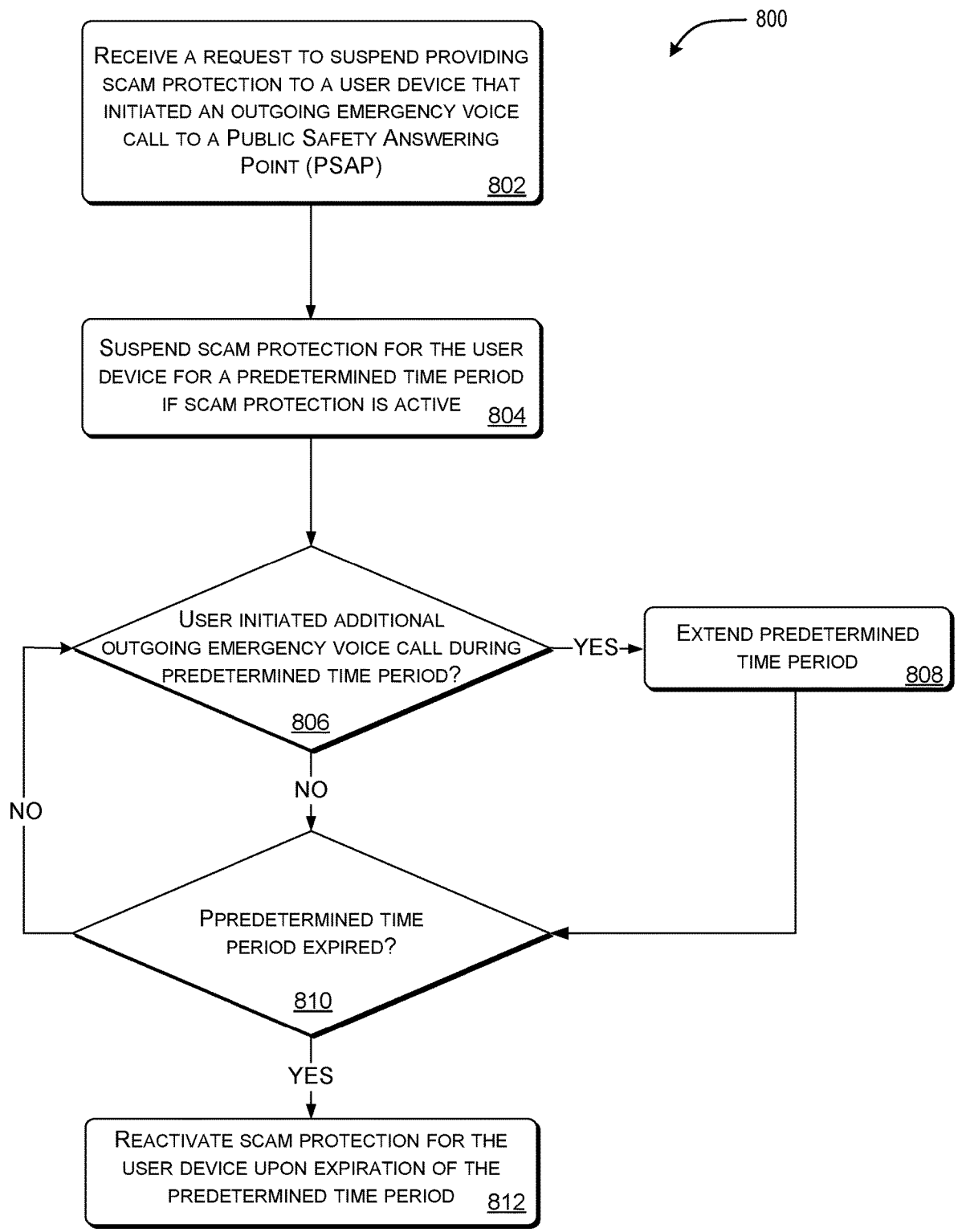
FIG. 8 is a flow diagram of an example process for scam mitigation back-off for a voice call.
Figure 9:
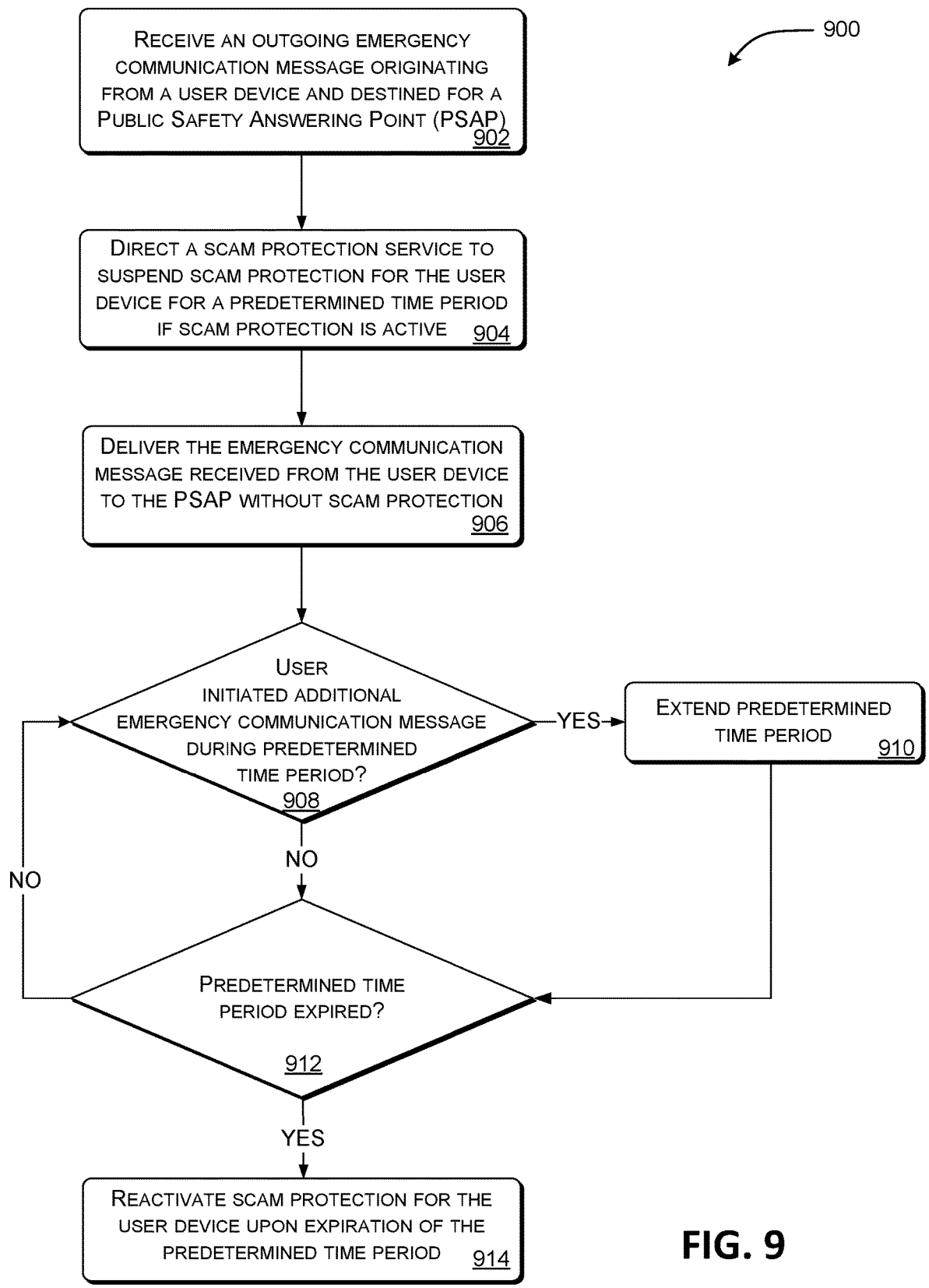
FIG. 9 is a flow diagram of an example process for scam mitigation back-off for a communication message.

FIGS. 8 and 9 present illustrative processes 800 and 900 for implementing scam mitigation. Each of the processes 800 and 900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like, that perform particular functions or implement particular abstract data types. The order in which the operations are described is not intended to be construed as a limitation, and any number of the described blocks can be combined in any order and/or in parallel to implement the process.

FIG. 8 is a flow diagram of an example process 800 mitigation of scam services. At block 802, a request to suspend providing scam protection to a user device that initiated an outgoing emergency voice call to a Public Safety Answering Point (PSAP) is received at the scam protection server.

At block 804 scam protection for the user device is suspended for a predetermined time period. The suspending of the scam protection allows the PSAP to make one or more return emergency voice calls to the user device without the scam protection server marking the one or more return emergency voice calls as a scam voice call during the predetermined time period. At block 806, it is determined whether the user initiated an additional outgoing call during the predetermined time period. If it is determined that the user initiated an additional outgoing call during the predetermined time period, the block 806 may be followed by block 808, which illustrates extending the predetermined time period. If it is determined that the user did not initiate an additional outgoing call during the predetermined time period, block 806 may be following by block 810. At block 810, it is determined if the predetermined time period has expired. If it is determined that the predetermined time period has not expired, then block 810 may be followed by block 806. If it is determined that the predetermined time period has expired, then block 810 may be followed by block 812. At block 812, scam protection for the user device may be reactivated.

FIG. 9 is a flow diagram of an example process 900 for implementing scam mitigation. At block 902, an outgoing emergency communication message originating from a user device and destined for a Public Safety Answering Point (PSAP) is received at the messaging server.

At block 904, in response to receiving the emergency communication message, a scam protection service is directed to suspend scam protection for the user device for a predetermined time period. A suspension of the scam protection allows the PSAP to send one or more return emergency communication messages to the user device without the scam protection service marking the one or more return emergency communication messages as a scam message during the predetermined time period. At block 906, the emergency communication message received from the user device is delivered to the PSAP without scam protection. At block 908, it is determined whether the user initiated an additional emergency communication message during the predetermined time period. If it is determined that the user initiated an additional emergency communication message during the predetermined time period, then block 908 may be followed by block 910, which illustrates extending the predetermined time period. If it is determined that the user did not initiate an additional emergency communication message during the predetermined time period, block 908 may be following by block 912. At block 912, it is determined if the predetermined time period has expired. If it is determined that the predetermined time period has not expired, then block 912 may be followed by block 908. If it is determined that the predetermined time period has expired, then block 912 may be followed by block 914, which illustrates reactivating scam protection for the user device upon expiration of the predetermined time period.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a scam protection server of a wireless carrier network storing computer-executable instructions that, when executed by one or more processors, perform acts comprising:
   receiving, at the scam protection server, a request to suspend providing scam protection to a user device that initiated an outgoing emergency voice call to a Public Safety Answering Point (PSAP);
   suspending scam protection for the user device for a predetermined time period, wherein the suspending of the scam protection allows the PSAP to make one or more return emergency voice calls to the user device without the scam protection server marking the one or more return emergency voice calls as a scam voice call during the predetermined time period; and
   reactivating scam protection for the user device upon expiration of the predetermined time period.

2. The one or more non-transitory computer-readable media of claim 1, wherein the receiving includes receiving the request from an Interconnect Session Border Controller (I-SBC) or a core network of the wireless carrier network that carried the outgoing emergency voice call.

3. The one or more non-transitory computer-readable media of claim 1, wherein the request includes a Mobile Station International Subscriber Directory Number (MSISDN) that identifies the user device to the scam protection server, and wherein the suspending includes suspending the scam protection for the user device based on the MSISDN.

4. The one or more non-transitory computer-readable media of claim 1, wherein the acts further comprise, in response to a determination that the request lacks an MSISDN that identifies the user device, retrieving the MSISDN that identifies the user device from a Gateway Mobile Location Center (GMLC) based on an alternative identifier included in the request, the alternative identifier comprising an International Mobile Equipment Identity (IMEI) or an Integrated Circuit Card Identifier (ICCID), wherein the suspending includes suspending the scam protection for the user device based on the MSISDN.

5. The one or more non-transitory computer-readable media of claim 2, wherein the acts further comprise:
receiving an additional request from the I-SBC of the wireless carrier network following the I-SBC receiving a return emergency voice call from the PSAP, the additional request requesting the scam protection server to determine whether the return emergency voice call is to be marked as a scam call; and
in response to determining that the additional request is received during the predetermined time period, sending a notification to the I-SBC that the scam protection is suspended to prompt the I-SBC to send the return emergency voice call to the user device without scam protection.

6. The one or more non-transitory computer-readable media of claim 1, wherein the acts further comprise:
receiving an additional request from a core network of the wireless carrier network following the core network receiving a return emergency voice call from the PSAP, the additional request asking the scam protection server to determine whether the return emergency voice call is to be marked as a scam call; and
in response to determining that the additional request is received during the predetermined time period, sending a notification to the core network that indicates the scam protection is suspended to prompt the core network to send the return emergency voice call to the user device without scam protection.

7. The one or more non-transitory computer-readable media of claim 1, wherein the acts further comprise in response to receiving, during the predetermined time period, an additional request to suspend providing scam protection to a user device that is associated with an additional outgoing emergency voice call from the user device to the PSAP, extending the predetermined time period by an additional time period that starts at a time that the additional request is received at the scam protection server.

8. A method performed by a messaging server of a wireless carrier network, the method comprising:
receiving, at the messaging server, an outgoing emergency communication message originating from a user device and destined for a Public Safety Answering Point (PSAP);
in response to receiving the emergency communication message, directing a scam protection service to suspend scam protection for the user device for a predetermined time period, wherein a suspension of the scam protection allows the PSAP to send one or more return emergency communication messages to the user device without the scam protection service marking the one or more return emergency communication messages as a scam message during the predetermined time period; and
delivering the emergency communication message received from the user device to the PSAP.

9. The method of claim 8, wherein the directing the scam protection service to suspend scam protection for the user device includes one of:
sending a first Session Initiation Protocol (SIP) invite message to an Interconnect Session Border Controller (I-SBC) of the wireless carrier network that directs the I-SBC to command the scam protection service to suspend scam protection for the user device;
sending a command to the scam protection service that directs the scam protection service to suspend scam protection for the user device; or
sending the emergency communication message to an intermediate network to cause the intermediate network to send a second SIP invite message to the I-SBC that directs the I-SBC to command the scam protection service to suspend scam protection for the user device.

10. The method of claim 8, wherein the delivering includes sending the emergency communication message to an intermediate network for the intermediate network to forward the emergency communication message to a messaging terminal of the PSAP.

11. The method of claim 8, further comprising:
receiving a return emergency communication message from the PSAP that is destined for the user device; and
in response to a determination that the scam protection for the user device is suspended, sending the return emergency communication message to a core network of the wireless carrier network for the core network to deliver the return emergency communication message to the user device without scam protection.

12. The method of claim 11, wherein the determination that the scam protection for the user device is suspended is made by an I-SBC of the wireless carrier network querying the scam protection service.

13. The method of claim 8, wherein in response to receiving, during the predetermined time period, an additional emergency communication message originating from the user device at the messaging server, extending the predetermined time period by an additional time period that starts at a time that the additional emergency communication message is received at the messaging server.

14. The method of claim 8, wherein the emergency communication message is a Short Message Service (SMS) message, a Rich Communication Services (RCS) message, or a Multimedia Messaging Service (MMS) message.

15. A system of a wireless carrier network comprising a processor and a memory storing computer-executable instructions that, when executed by the processor, cause the system to perform acts comprising:
receiving a request to suspend providing scam protection to a user device that initiated an outgoing emergency voice call or an outgoing emergency communication message to a Public Safety Answering Point (PSAP);
suspending scam protection for the user device for a predetermined time period, wherein the suspending of the scam protection allows the PSAP to make one or more return emergency voice calls or send one or more return emergency communication messages to the user device without marking the one or more return emergency voice calls as a scam voice call or marking the one or more return emergency communication messages as a scam message during the predetermined time period; and reactivating scam protection for the user device upon expiration of the predetermined time period.

16. The system of claim 15, wherein the receiving includes receiving the request from an Interconnect Session Border Controller (I-SBC) or a core network of the wireless carrier network that carried the outgoing emergency voice call.

17. The system of claim 15, further comprising computer-executable instructions that, when executed by the processor, cause the system to perform acts comprising:

sending a first Session Initiation Protocol (SIP) invite message to an Interconnect Session Border Controller (I-SBC) that directs the I-SBC to command a scam protection service to suspend scam protection for the user device;

sending a command to the scam protection service that directs the scam protection service to suspend scam protection for the user device; or sending the emergency communication message to an intermediate network to cause the intermediate network to send a second SIP invite message to the I-SBC that directs the I-SBC to command the scam protection service to suspend scam protection for the user device.

18. The system of claim 15, wherein the request includes a telephone number, E.164 formatted number, or a Mobile Station International Subscriber Directory Number (MSISDN) that identifies the user device, and wherein the suspending includes suspending the scam protection for the user device based on the telephone number, E.164 formatted number, or MSISDN.

19. The system of claim 15, further comprising computer-executable instructions that, when executed by the processor, cause the system to perform acts comprising:

receiving a return emergency communication message from the PSAP that is destined for the user device; and in response to a determination that the scam protection for the user device is suspended, sending the return emergency communication message to a core network of the wireless carrier network for the core network to deliver the return emergency communication message to the user device without scam protection.

20. The system of claim 15, further comprising computer-executable instructions that, when executed by the processor, cause the system to perform acts comprising:

in response to receiving, during the predetermined time period, an additional request to suspend providing scam protection to a user device that is associated with an additional outgoing emergency voice call from the user device to the PSAP, extending the predetermined time period by an additional time period that starts at a time that the additional request is received.

\* \* \* \* \*